J. Francis.
Corrugating Metal Plates.
Nº 38,799.    Patented Jun. 2, 1863.

Witnesses.

Inventor.
Joseph Francis

UNITED STATES PATENT OFFICE.

JOSEPH FRANCIS, OF NEW YORK, N. Y.

IMPROVEMENT IN CORRUGATING METAL PLATES.

Specification forming part of Letters Patent No. 38,799, dated June 2, 1863.

*To all whom it may concern:*

Be it known that I, JOSEPH FRANCIS, a citizen of the United States, and a resident of the city, county, and State of New York, have invented a new and useful Mode of Corrugating Metal Plates; and I do hereby declare and ascertain my said invention, referring to the following drawings.

Figure 1:
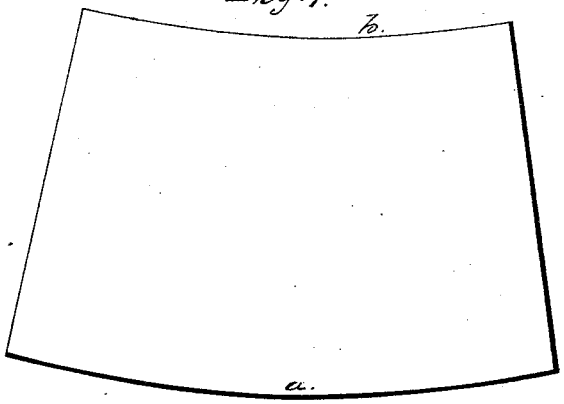
Figure 2:
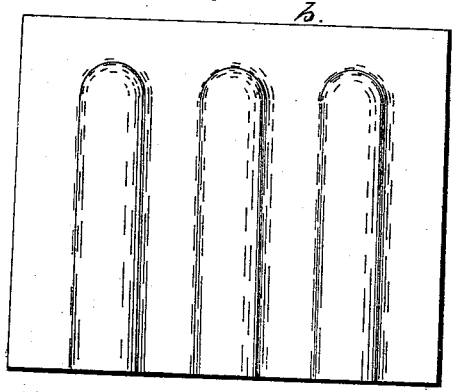
Figure 3:

Figure 1 is a blank plate prepared for corrugating. Fig. 3 is an edge view thereof across the corrugations. Fig. 2 is a plan of a portion thereof.

In the construction of my various inventions—such as corrugated-iron vessels, pontons, army-wagons, and the like—great inconvenience was found in turning angles and forming joints at the corners, while the greatest lightness consistent with sufficient strength was of the highest importance. To effect this object it became essential to stop the corrugations before they reached the end of the plate, so as to leave a space between them and the edge of the plate along their ends—a flat surface for the purpose of turning at an angle to form a corner joint. Attempts had before been made to form stop-corrugations, (although I am not aware that they were ever made successful,) by reducing the portion which was formed into corrugations as much thinner than the straight edge of the plate as was necessary to form the greater extent of surface required for the corrugations. This, for my purposes, would be of no practical value if the plates could be so made. I had, therefore, to devise a means of making a stop-corrugation upon a plate of metal of nearly equal thickness throughout, so as to leave the edge flat and straight and without changing the thickness of the plate essentially in any part. This I have succeeded in doing in the following way.

To corrugate a plate of metal and leave the flat plain ends as thin as the corrugated part it is necessary, first, to cut the plate into the form shown in Fig. 1, in which the edge $a$ is as much longer than the edge $b$ as is necessary to be taken up in the corrugation. A plate thus formed I corrugate, as seen in the Figs. 2 and 3, and when it leaves the corrugating apparatus it assumes the form seen in Fig. 2, the edge $b$ being straight and flat and of the same thickness as the body of the corrugated portion, so as to be readily turned at an angle to form the corner or joint in the manufacture of various articles to which it is adapted, the act of corrugating causing the concave edge $b$ to come into a straight line, as seen in Fig. 2.

Having thus fully described my improved stop-corrugation, what I claim, and desire to secure by Letters Patent, is—

Forming a corrugation in a plate of metal which stops short of the edge of said plate, substantially of the same thickness as the flat straight edge, substantially as and for the purposes set forth.

JOSEPH FRANCIS.

Witnesses:
 A. H. HOOD,
 WM. L. W. CHAPMAN.